Aug. 11, 1970 M. J. LA VIANO 3,523,339

JEWELRY PIN CLUTCH

Filed Nov. 14, 1968

INVENTOR.
Michael J. La Viano
BY

ATTORNEYS 3,523,339
JEWELRY PIN CLUTCH
Michael J. LaViano, 273 Glen Road,
Woodcliff Lake, N.J. 07680
Filed Nov. 14, 1968, Ser. No. 775,708
Int. Cl. A44b 9/10
U.S. Cl. 24—155                                        2 Claims

ABSTRACT OF THE DISCLOSURE

A jewelry pin clutch features a helical spring mounted in a case along with a yoke-shaped cam so positioned that the cam yoke can be moved against opposite ends of the spring to cause the internal diameter of its helical body portion to expand and thus permit entry or removal of a jewelry pin.

---

This invention relates to jewelry and the like and, more particularly, to a clutch device for releasably engaging a jewelry pin.

Jewelry pin locks have been proposed and developed heretofore of two different types. One type is designed to engage an enlarged end portion of a jewelry pin and usually utilizes two spaced spring elements adapted to permit snap-lock entry of the enlarged end of the pin past the spaced spring elements. The other type generally utilizes a spring loaded cam which engages the pin firmly enough to resist its withdrawal, but this firm engagement tends to roughen the surface of the pin so that the pin will damage a fine fabric through which it is inserted.

I have now developed a locking device for a jewelry pin which acts as a clutch to engage or release the pin. The pin clutch of the invention comprises a hollow-case, a helical spring positioned within the case and having a central helix portion and extending end portions projecting radially outwardly from the axis of the helix, and a cam member having a body portion positioned within the case and an operating portion extending outwardly through an opening in the case. The body portion of the cam member is provided with yoke-forming arms adapted to engage the two spring end extensions and to bear against the spring end extensions in a direction to uncoil the spring helix. The case is provided with oppositely spaced pin openings aligned with the axis of the helix and adapted to permit entry of a jewelry pin having a diameter greater than the internal diameter of the spring helix when the spring is at rest. The depth of the cam yoke is sufficient to permit the cam member body portion to be moved toward the spring helix so that the yoke arms move the spring end extremities in a spring-unwinding direction when inwardly directed pressure is applied against the operating portion of the cam member.

These and other novel features of the pin clutch of the invention will be more fully understood from the following discussion taken in conjunction with the drawings in which FIG. 1 is a perspective view of the pin clutch engaging a jewelry tie tack;

Figure 1:
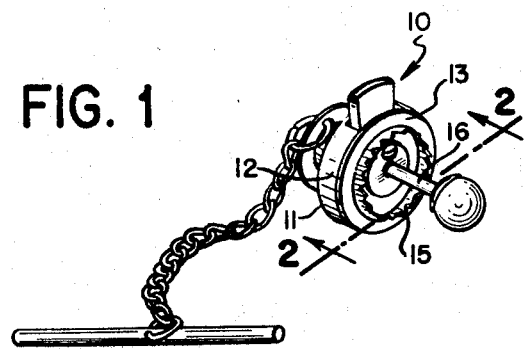
Figure 2:
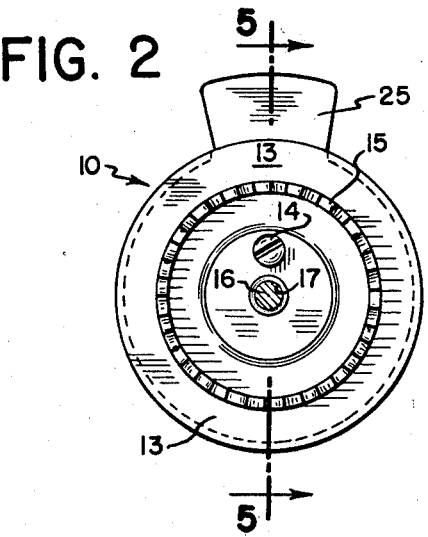
FIG. 2 is a plan view of the clutch case taken along line 2—2 in FIG. 1.
Figure 5:
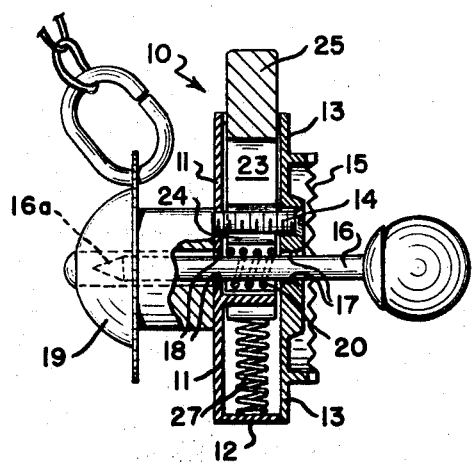
FIG. 5 is a side elevation, partly in section, of the pin clutch shown in FIG. 1.

As shown in FIGS. 1 and 5, the pin clutch advantageously comprises a case 10 having a bottom wall 11 and a cylindrical side wall 12 integrally formed therewith. The edge of the side wall 12 opposite the bottom wall 11 engages a cover wall 13 which is held in place by a screw 14 extending through the case and into the bottom wall 11. If desired, the cover wall can be provided with a serrated projecting crown 15 adapted to make a non-slip contact with any material through which a jewelry pin 16 protrudes. The pin 16 extends through an opening 17 in the cover wall 13 and through an axially aligned opening 18 in the bottom wall 11 of the case. If desired for esthetic purposes, the bottom wall 11 can be provided with a cap 19 in order to enclose the projecting pointed end 16a of the jewelry pin.

Figure 3:
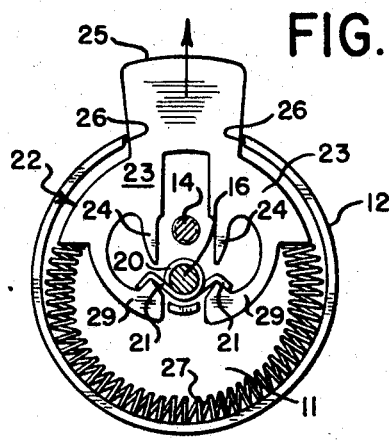
FIG. 3 is a plan view of the clutch with its top cover face removed.
Figure 4:
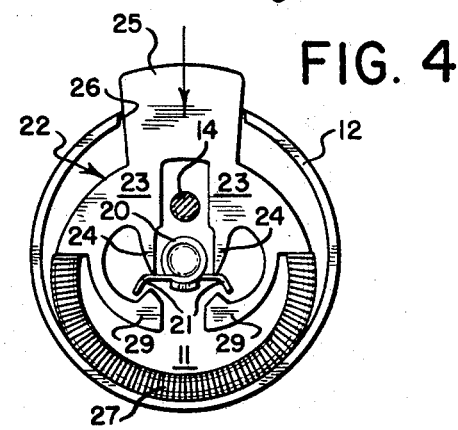
FIG. 4 is similar to FIG. 3 but shows the operating cam depressed to enlarge the helical spring and release the pin.

Within the case, as shown in FIGS. 3 and 4, there is a helical spring 20 having at least one full turn, and advantageously a plurality of turns, positioned with its axis aligned with the axis of the jewelry pin 16. The internal diameter of the helical spring 20, at rest, is slightly less than the diameter of the jewelry pin 16 so that when the pin is inserted through the axis of the spring helix the radially-acting compressive force of the spring will frictionally engage the pin and restrain it against axial movement. The end portions of the helical spring terminate in extensions 21 projecting radially outwardly from the axis of the spring on the same side of a diameter of the spring. Thus, movement of both spring end extensions simultaneously in a direction normal to the spring axis will tend either to wind the spring or to unwind the spring. Unwinding the spring increases its internal diameter, and winding the spring tightens it and decreases its internal diameter.

Control over the spring size is offered by a flat cam member 22 also positioned within the case 10. The cam member comprises a body portion 23 of generally arcuate shape but appreciably smaller than the corresponding portion of the case within which it is positioned so that it has freedom of movement within the case. The body portion of the cam member is provided with yoke-forming arms 24 extending to, or nearly to, contact with the spring end extensions 21. The depth of the yoke defined by the cam member arms 24 is sufficient to permit movement of the cam member toward the helical spring 20 with its arms straddling the body of the helix. The side of the cam member body portion 25 extending outwardly from the case 10 through an opening 26 in the cylindrical side wall 12 of the case. The cam member is advantageously held in a position with its yoke-arms 24 drawn away from the helical spring end extensions 21 by a suitable compression spring within the case such as a coil spring 27 in FIG. 3 or an S-shaped spring 28 in FIG. 6, or the like. Thus, when the operating portion 25 of the cam member is pressed inwardly, as shown by the arrow in FIG. 4, the cam member arms 24 engage and move the helical spring end extensions 21 in a direction to unwind the spring helix and thus enlarge the internal diameter of the helix. The helical spring 20 will then permit entry or removal of the jewelry pin 16. Removal of pressure on the operating portion 25 of the cam member permits the compression spring 27 to move the cam member to its inoperative position and release its pressure on the helical spring end extension 21 so that the spring helix will either engage the pin 16 or, if the pin is not inserted, will permit the helical spring to return to its "at rest" condition.

It will be understood that the cam member compression spring 27 (or 28) can be omitted so that the cam member is returned to its inoperative position by the restorative action of the helical spring when the spring has sufficient power to do so. For example, the helical spring can be made of several turns of fine piano wire and will have sufficient restorative power to return the cam member 22 to its inoperative position without a cam member compression spring. However, I have found that a superpolyamide wire (such as nylon) or a polyethylene wire makes a most effective helical spring 20 but generally does not have sufficient restorative power to return the cam fully to its inoperative position without a cam member compression spring.

The use of a cam member compression spring has an additional advantage in that it can be used to augment the pin-clutching action of the helical spring 20. For example, the body portion of the cam member is advantageously provided with a second pair of yoke-forming arms 29 having hook-shaped ends adapted to engage the helical spring end extensions 21 and draw them back into helix-tightening position as the cam member compression spring returns the cam member to its inoperative position. The resulting helix-winding action enhances the pin-gripping power of the clutch. A similar action is provided in the modification shown in FIG. 6 where bosses 30 on the second pair of yoke-forming arms 29 of the cam member tend to press upwardly against the helical spring end extensions 21 as the cam member 22 is returned to its inoperative position by the compression spring 28. As a further modification in FIG. 6, the first pair of yoke-forming arms 24 of the cam member are hook-shaped so that the extremities of the helical spring end extensions 21 can be hooked thereonto.

Figure 6:
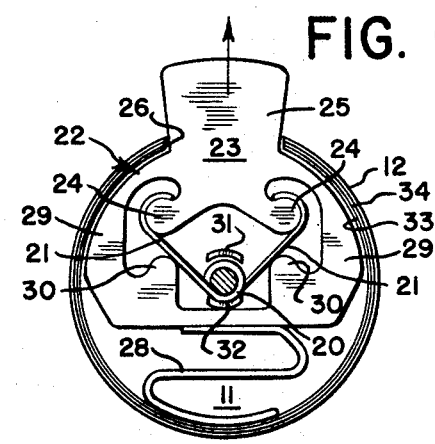
FIG. 6 is a plan view of another modification of the pin clutch of the invention with its cover face removed.

As further shown in FIG. 6, the helical spring 20 is held substantially in place within the case, when the jewelry pin is not present, by two arcuate bosses 31 and 32 struck up from the bottom wall 11 and spaced apart by a distance at least equal to the external diameter of the spring helix 20 in its unwound state. Alternatively, this same result can be obtained by eliminating the boss 31 and replacing it, as shown in FIGS. 3 and 4, with the cover wall screw 14. In the modification shown in FIG. 6, where the cover wall screw 14 is not relied upon to hold the cover wall 13 in place, the top edge of the cylindrical side wall 12 is partially cut away to form an annular shoulder 33 and an upstanding flange 34 so that the cover wall 13 can be set on the shoulder 33 and held in place by peening over the flange 34.

It will be appreciated, from the foregoing discussion, that the pin clutch of the invention provides releasable frictional engagement of a jewelry pin by the inner surfaces of the turns of a helical coil spring. This frictional contact does not mar or roughen the surface of the pin, even when the pin is made of relatively soft gold, so that the pin does not damage the material through which it is inserted. The simplicity of the components of the clutch, and of their assembly, permits economical commercial production, and further makes possible a flat compact structure which can easily be made as small as, or smaller than, other devices proposed or produced heretofore using wedging cams, snaps, or the like.

I claim:

1. A pin clutch adapted to releasably engage a jewelry pin and comprising a hollow-case, a helical spring positioned within the case and having a central helix portion and extending end portions projecting radially outwardly from the axis of the helix, and a cam member having a body portion positioned within the case and an operating portion extending outwardly through an opening in the case, the body portion of the cam member being provided with yoke-forming arms adapted to engage the two spring end extensions and to bear against the spring end extensions in a direction to uncoil the spring helix, the case being provided with oppositely spaced pin openings aligned with the axis of the helix and adapted to permit entry of a jewelry pin having a diameter greater than the internal diameter of the spring helix when the spring is at rest, the depth of the arm yoke being sufficient to permit the cam member body portion to be moved toward the spring helix so that the yoke arms move the spring end extremities in a spring-unwinding direction when inwardly directed pressure is applied against the operating portion of the cam member.

2. A pin clutch according to claim 1 in which the cam member is provided with a second set of yoke-forming arms adapted to engage the helical spring end extensions in the opposite direction from the first-mentioned yoke-forming arms, and a second spring is positioned within the case in contact with the cam member so as to urge the cam member toward its inoperative position and to cause the second set of yoke-forming arms on the cam member to return the helical spring end extensions to a helix-tightening state.

References Cited

UNITED STATES PATENTS

| 1,911,935 | 5/1933 | Vidal | 24—110 |

FOREIGN PATENTS

| 7,512 | 1887 | Great Britain. |
| 19,421 | 1911 | Great Britain. |
| Ad. 41,781 | 1/1933 | France. (1st Add. to 726,752) |
| 1,101,361 | 4/1955 | France. |

DONALD A. GRIFFIN, Primary Examiner

U.S. Cl. X.R.

24—49; 63—12

PO-1050
(5/69)

UNITED STATES PATENT OFFICE
CERTIFICATE OF CORRECTION

Patent No. 3,523,339            Dated     August 11, 1970

Inventor(s)     MICHAEL J. LA VIANO

It is certified that error appears in the above-identified patent and that said Letters Patent are hereby corrected as shown below:

Column 2, line 47, after "portion" and before "25", the following words should be inserted --opposite the arms 24 is provided with an operating portion

SIGNED AND
SEALED
OCT 20 1970

(SEAL)
Attest:

Edward M. Fletcher, Jr.
Attesting Officer

WILLIAM E. SCHUYLER, JR.
Commissioner of Patents